(No Model.) 4 Sheets—Sheet 1.
G. GRISEL.
MACHINE FOR WRAPPING BLOCK MATCHES.
No. 419,851. Patented Jan. 21, 1890.
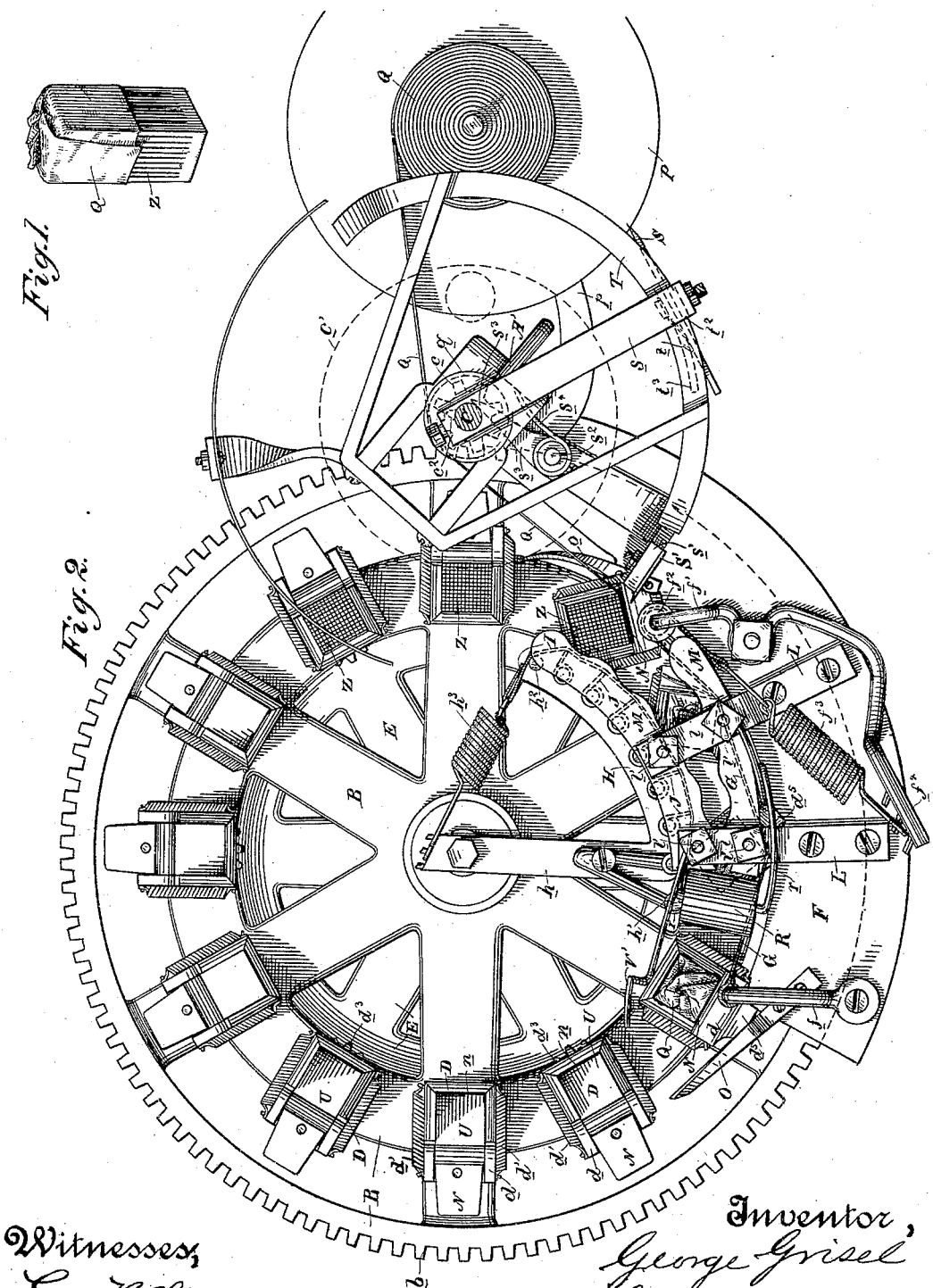

(No Model.)
P. H. GRIFFIN.
CAR WHEEL.
No. 419,850. Patented Jan. 21, 1890.
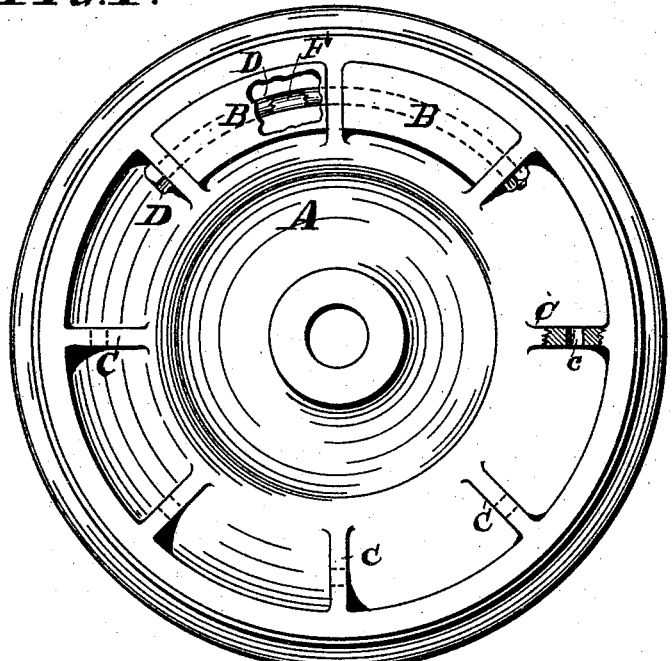
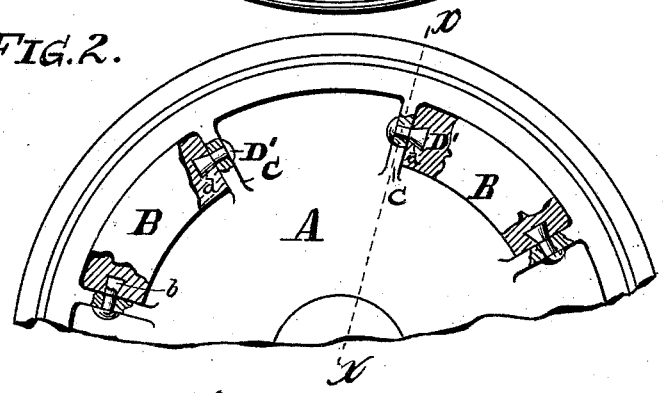
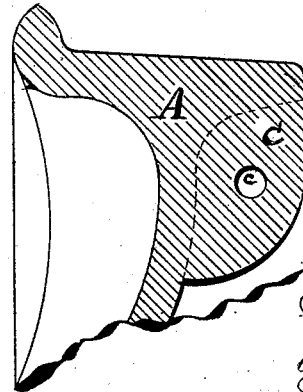
Witnesses:
Jno. P. Stark
A. Stark
Inventor:
Patrick H. Griffin
by Michael J. & Wm. O. Stark
Attorney.